(12) United States Patent
DeBenedictis et al.

(10) Patent No.: US 8,289,603 B2
(45) Date of Patent: Oct. 16, 2012

(54) OPTICAL PATTERN GENERATORS USING AXICON SEGMENTS

(75) Inventors: Leonard C. DeBenedictis, Palo Alto, CA (US); David A. Dewey, Sunnyvale, CA (US); George Frangineas, Fremont, CA (US); Barry G. Broome, Carlsbad, CA (US)

(73) Assignee: Reliant Technologies, Inc., Hayward, CA (US)

( * ) Notice: Subject to any disclaimer, the term of this patent is extended or adjusted under 35 U.S.C. 154(b) by 680 days.

(21) Appl. No.: 12/333,079

(22) Filed: Dec. 11, 2008

(65) Prior Publication Data
US 2009/0195848 A1    Aug. 6, 2009

Related U.S. Application Data

(60) Provisional application No. 61/026,459, filed on Feb. 5, 2008.

(51) Int. Cl.
*G02B 26/08* (2006.01)
(52) U.S. Cl. ............... 359/219.2; 359/204.1; 359/207.1; 359/207.2; 359/207.3
(58) Field of Classification Search ............... 359/219.2, 359/204.1–207.2, 207.6
See application file for complete search history.

(56) References Cited

U.S. PATENT DOCUMENTS

| 4,391,526 | A | | 7/1983 | McLaughlin |
| 5,343,029 | A | * | 8/1994 | Katoh et al. ............. 235/462.39 |
| 5,796,112 | A | | 8/1998 | Ichie |
| 2006/0023285 | A1 | * | 2/2006 | Lai ............................... 359/216 |
| 2007/0285662 | A1 | | 12/2007 | Sharpe et al. |

OTHER PUBLICATIONS

PCT International Search Report and Written Opinion, PCT/US08/86418, Feb. 6, 2009, 7 pages.
The Patent Office of the People's Republic of China, First Office Action issued in related Chinese application No. 200980127913.2 dated Jun. 18, 2012.

* cited by examiner

*Primary Examiner* — James Phan
(74) *Attorney, Agent, or Firm* — Wood, Herron & Evans, LLP

(57) ABSTRACT

Optical pattern generators use rotating reflective axicon segments to produce images that can have different dimensions along the pattern direction compared to the cross pattern direction. Examples include both single axicon pattern generators and dual axicon pattern generators that independently control the image space relative aperture and thereby control the image dimensions in two orthogonal directions.

16 Claims, 19 Drawing Sheets

OPTICAL PATTERN GENERATORS USING AXICON SEGMENTS

CROSS-REFERENCE TO RELATED APPLICATION

This application claims priority under 35 USC §119(e) to U.S. Provisional Patent Application No. 61/026,459 titled "Optical Pattern Generators Using Axicon Segments" filed on Feb. 5, 2008, which is incorporated by reference herein in its entirety.

BACKGROUND OF THE INVENTION

1. Field of the Invention

This invention relates generally to optically generating a pattern of figures such as arrays of image points, spots, or lines. More particularly, this invention relates to generating such patterns using a rotating component that has a plurality of axicon deflection segments.

2. Description of the Related Art

The optical generation of a pre-defined pattern of spots or image structures is used in a variety of applications. Digital copiers, hand-held bar code scanners, industrial cutting or welding operations, printers, fingerprint identification, light show entertainment, telecommunications switching, medical applications, and optical displays are a few examples. Among the most common mechanisms for generating patterns of figures are tilting mirrors (e.g. oscillating mirrors driven by galvanometers) and reflection from rotating convex polygons.

However, optical pattern generators based on tilting mirrors typically have characteristics that make them unsuitable for certain applications. For example, pattern generation in these devices is achieved by scanning the tilting mirror back and forth. But oscillating, or back-and-forth scanning, of a tilting mirror requires that the mirror movement come to a stop and then reverse its direction. This takes time, which limits the rate at which the pattern can be produced. To increase the pattern generation rate, the mirror in these systems is often driven near the galvanometer resonant frequency. However, this severely restricts the patterns that can be produced and reduces the system duty cycle. For example, it is difficult to produce irregular patterns because the mirror motion is restricted to be oscillatory. The near-resonance condition also limits the range of pattern generation rates that can be achieved. For example, it is difficult to tune such a system over a wide range of rates since the near-resonance condition only exists over a small range of rates. In addition, the angular velocity of resonant pattern generators is usually sinusoidal and not suitable for a large number of applications where dwell time at each point must be reasonably constant and reasonably long in duration.

If a two-dimensional image pattern is desired (e.g. a series of parallel lines or a two-dimensional pattern of spots), then typically a single mirror is tilted in two directions simultaneously or two coordinated tilting mirrors are used.

In many cases the efficiency or duty cycle of the energy source such as a laser is also important. The efficiency or duty cycle may be defined as the fraction of energy deposited in a desired pattern at the treatment location compared to the total energy delivered by the source in a given period of time. If a pattern is sparse compared to the background field of view, it is preferable to turn off the energy source and scan quickly over the unexposed background, and then turn the source back on when the image has settled over the image point to be exposed. This requires an even more responsive device that can accelerate, decelerate, and settle quickly. As a result of these requisite characteristics, galvanometer or convex polygon or other prior art mechanisms are not well suited for high-speed pattern generation, particularly if the pattern is an irregular or a sparse pattern.

In the rotating convex polygon systems, the multiple sides of a three-dimensional polygon are made reflective and the polygon is rotated about a central axis. As each reflective side of the polygon rotates through an incident optical beam, the optical beam is reflected to generate a locus of points on a scanned line. The rotation of each reflective side produces a different scanned line. If all of the polygon sides are identical then the same line is scanned by each of the polygon sides. If the reflective sides have different prism angle with respect to the central rotation axis then each side produces a different displaced scan line.

However, the rotating polygon approach also has drawbacks that make it unsuitable for certain applications. For example, systems that produce a series of scan lines can suffer from aberrations induced by the polygon rotation. In order to produce a series of scanned lines, each polygon side must have a different pyramidal angle that offsets the scan line in a direction perpendicular to the direction of scan. However, as each side rotates through the incident optical beam, the angular orientation of the reflective polygon side changes with rotation angle. This can cause changes in the amount of offset as a function of rotation angle and/or introduce other unwanted image aberrations. One example of an unwanted image aberration is line bow. The ideal scan line is usually a straight line, but the actual scan line is often a bow-shaped arc due to the change in reflective surface angular orientation with polygon rotation. The sag of the image arc is the "bow" in the scan line and the amount of bow is usually dependent upon the amount of pyramidal angle on the reflective side of the polygon. When different lines are scanned using different pyramidal angles on the polygon sides, different amounts of line bow are produced for each scanned line.

Scan line bow and other effects caused by polygon rotation can cause additional problems, depending on the application. For example, in some applications the scanning action is used to compensate for motion of the scanner system relative to the treatment location (or surface) so that the optical pattern ideally remains fixed on the treatment location as the optical system is moved with respect to the surface. In this case, scan line bow and other polygon-induced aberrations will cause the optical pattern to move in the direction perpendicular to the scan direction. The unwanted movement of the optical pattern with respect to the treatment location/surface results in an unwanted image blur.

Optical pattern generators such as the galvanometer-driven mirror or the convex rotating polygon typically require complex multi-element anamorphic optical systems to produce image points that have different dimensions in two orthogonal directions. Some applications require an image that is strongly elliptical rather than circular. Industrial welding applications and some medical applications require this condition of an anamorphic image structure. The complexity of these optical systems makes it very difficult to keep the same image structure geometry across the area of the treatment location because the anamorphic optical systems have aberrations that vary with image field location.

Therefore, there is a need for optical pattern generators that can operate at high speeds with high duty cycle, with possibly long dwell times at each image point, and particularly for the generation of irregular patterns. There is also a need for pattern generators with reduced aberrations and/or reduced image blurring. There is a further need in many applications for image structures that are anamorphic and relatively constant in shape across the image field.

SUMMARY OF THE INVENTION

The present invention overcomes the limitations of the prior art by providing an optical pattern generator that uses a rotating component with axicon segments. The rotating component includes a plurality of reflective axicon segments. At least two of the axicon segments have different included angles. The rotating component is positioned so that the axicon segments rotate through an incident optical beam as the rotating component rotates about its rotation axis. Each axicon segment deflects the incident optical beam to generate a figure. The axicon segments in the aggregate generate a pattern of figures.

In another aspect, the optical pattern generator further includes anamorphic optics (e.g., cylindrical lenses). Some anamorphic optics compress the incident optical beam in the sagittal plane as imaged onto the axicon segments (e.g., by imaging the optical beam onto a line focus). Additional anamorphic optics then decompress the optical beam in the sagittal plane after leaving the axicon segment. In this way, the width of the optical beam on the axicon segment is reduced, thus increasing the duty cycle. In addition, the shape of the figures produced at the target location can be adjusted by adjusting the relative optical powers of the anamorphic optics. For example, the numerical apertures and/or spot widths of the optical beam in the sagittal and meridional planes at the target location can be adjusted.

Axicons are surfaces of revolution. They are rotationally symmetric about an axis of revolution. In some embodiments, the axicon segments are positioned so that their axes of revolution are coincident with the rotation axis for the rotating component. In this way, the shape presented by an axicon segment to the optical beam does not change as the axicon segment rotates through the optical beam and the corresponding figure produced will also not change. In an alternate approach, the rotation axis is parallel to but displaced from the axes of revolution. This can be used to create figures that change slightly (e.g., that move slightly), which can be used to advantage in certain applications.

Overall throughput can be increased by using multiple optical beams incident on the optical pattern generator.

In another implementation, the optical pattern generator uses a dual axicon design. In this case, there are two components, at least one of which is rotating. Both components have reflective axicon segments. For the rotating component(s), the axicon segments rotate through the optical beam as the rotating component rotates about its rotation axis. The incoming optical beam is deflected by one axicon segment from each component. The two axicon segments cooperate to deflect the incident optical beam to generate a figure from the pattern of figures. Many different configurations are possible. For example, the first component may be rotating and the second stationary, or the first component may be stationary and the second rotating, or both components may be rotating. In one approach, both components are rotating and they are the same, thus reducing the overall part count. As described above, anamorphic optics can also be used to compress the optical beam as imaged onto the axicon segments.

The optical pattern generators described above can be advantageously used for various applications. For example, they can be used to deposit optical energy onto human tissue, either externally onto the skin or internally through various orifices. The optical energy can be used to accomplish different purposes: local heating, ablation, cutting, or cauterizing, for example. The devices can also be used to deposit optical energy onto other materials: metal powders, or other industrial materials, for example. Cutting, welding, ablation, and marking are examples of manufacturing processes that can be implemented using this invention. The devices can also be used in laser or LED printers, optical imaging scanners, or copy machines. Other applications will be apparent.

In many cases, these axicon elements can be manufactured either by direct machining or by replication methods such as plastic injection molding, electroforming, or epoxy replication.

Other aspects of the invention include methods corresponding to the devices, their manufacture, and their applications.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
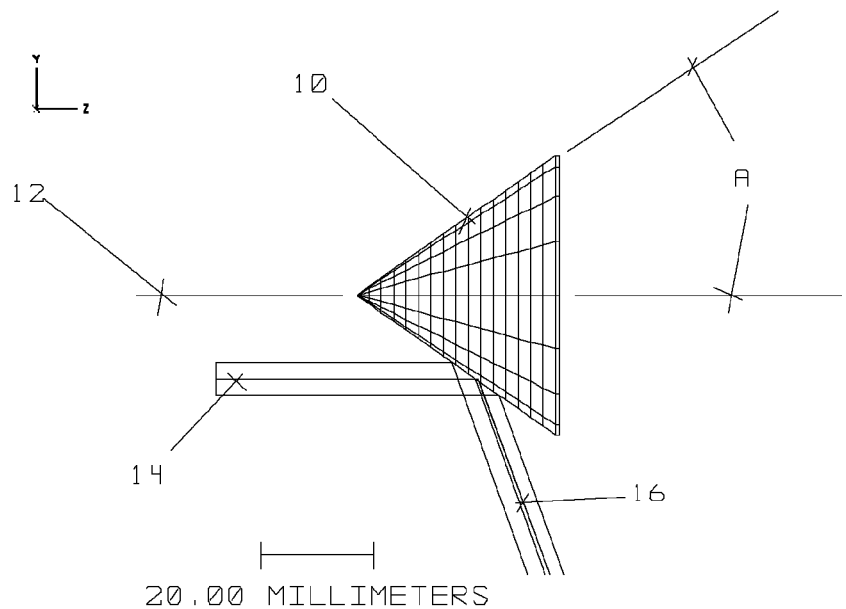
FIGS. 1A and 1B are diagrams showing reflection in the meridional plane from an axicon segment with included angle A and A', respectively.

FIG. 1A is a diagram showing reflection in the meridional plane of an incident optical beam 14 from a reflective axicon surface 10, which is a surface of revolution about the axis of revolution 12. In this case, the axicon has the shape of a right circular cone. The grid superimposed on the axicon 10 in FIG. 1A (and in many of the other Figures) is an artifact of the drawing program; it is not meant to imply that each trapezoidal area within the grid is piecewise flat. The included angle of the axicon is marked A. This included angle is half the apex angle of the cone from which the axicon is generated. The reflected optical beam 16 is also shown. Because the axicon surface 10 is a surface of revolution, rotation about the axis of revolution 12 does not change the surface shape and the reflected optical beam 16 does not change direction of propagation as the axicon surface 10 is rotated.

Figure 1B:
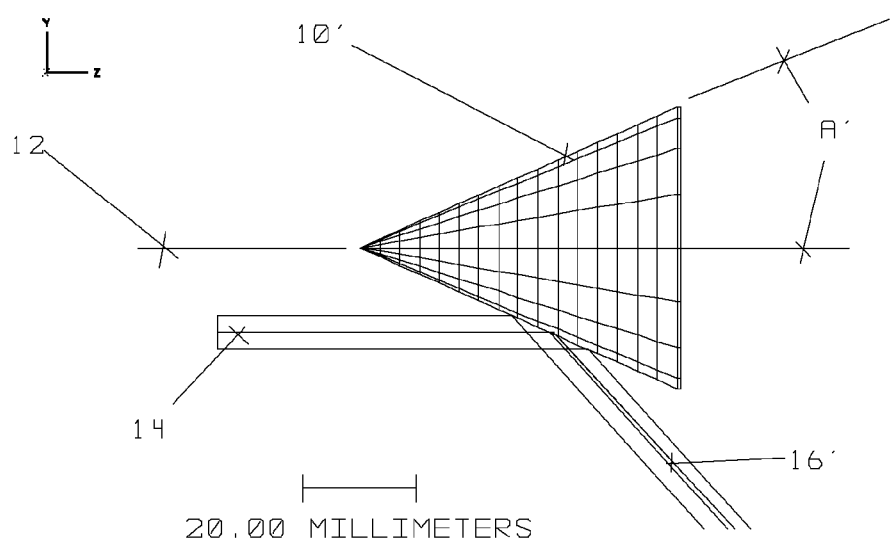

FIG. 1B is the same as FIG. 1A, except the axicon 10' has a different included angle A'. As a result, the reflected optical beam 16' propagates at a different angle compared to FIG. 1A. However, as in FIG. 1A, rotation of the axicon 10' about its axis of revolution 12 does not change the shape of the surface and the reflected optical beam 16' does not change its direction of propagation as the axicon 10' is rotated.

In one embodiment, an optical pattern generator includes a rotating component that has a plurality of reflective axicon segments. In FIGS. 1A and 1B, each axicon 10, 10' spanned the entire 360 degrees around the axis of revolution 12. However, axicon segments can be formed that span less than 360 degrees. These are segments of the corresponding cone, rather than the entire cone. Different segments can then be assembled to span the entire 360 degrees. For example, assume that each axicon segment spans 15 degrees. The first segment may have included angle A, the next segment included angle A' and so on for all 24 segments. Now assemble these segments into a component that rotates, where the axis of rotation is coincident with the axis of revolution for each axicon segment. As the component containing the axicon segments rotates about common axis 12, each of the different reflective axicon segments rotate through the incident optical beam 14 in turn, thereby producing a series of reflected beams 16, 16', etc. which can each have a different reflected angle. Furthermore, since the segments are axicons rotating about their axis of revolution, the reflected beam does not change as one particular segment rotates through the incident optical beam, although it will change as different segments rotate through the optical beam.

Figure 2A:
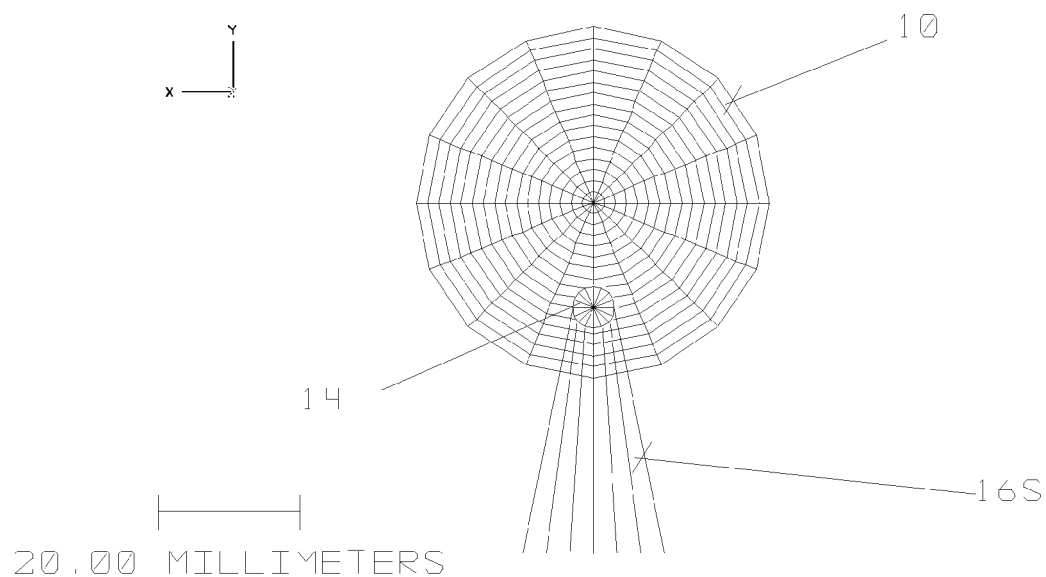
FIGS. 2A and 2B are diagrams showing an end view of the axicon reflector illustrating different beam divergences in the sagittal plane.

FIG. 2A is a diagram showing reflection in the sagittal plane of a collimated incident optical beam 14 from a reflective axicon surface 10. The collimated optical beam diverges strongly upon reflection in the sagittal plane. The amount of divergence of the reflected beam 16S is a function of the size of the incident beam on the axicon surface in the sagittal direction. Seven rays are shown in this example. These seven rays in the reflected optical beam 16S diverge strongly and the divergence angle is a function of the distance of the incident ray upon the sagittal dimension of the axicon surface 10 so that the rays do not appear to emanate from a single point. The ray fan in the sagittal plane is aberrated.

This divergence can be useful for varying the relative aperture between the meridional and sagittal planes of the system, but the displacement on the axicon surface 10 substantially reduces the system duty cycle. The duty cycle of the axiconic optical pattern generator system is a function of the sagittal width of the incident beam's footprint on the axicon surface. A wider footprint means a lower duty cycle for a given diameter rotating component or, conversely, a larger diameter rotating component for a given duty cycle.

Figure 2B:
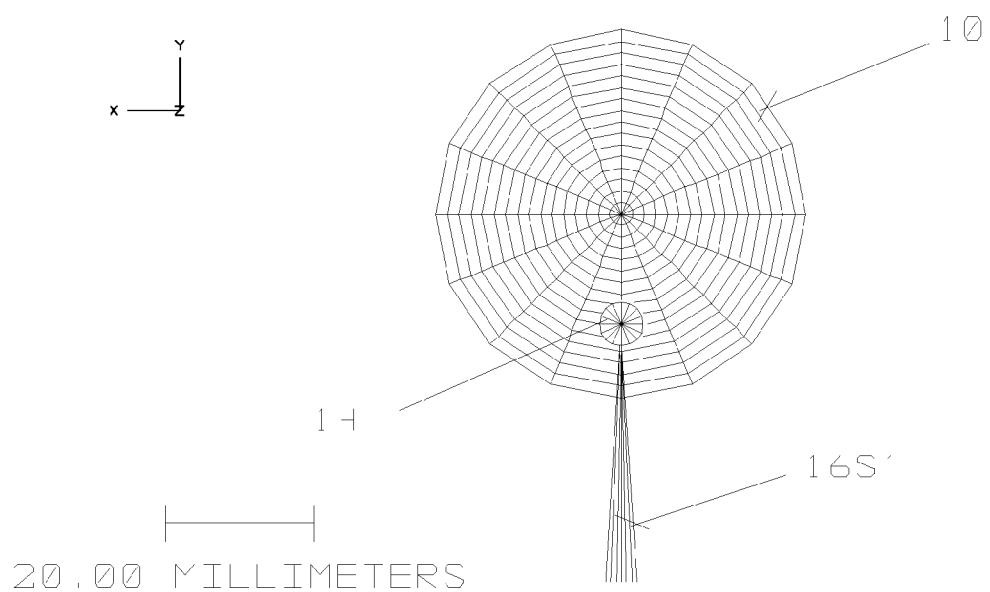

FIG. 2B is the same as FIG. 2A, except, in the sagittal dimension, the incident optical beam 14 has been focused onto the axicon reflective surface 10. As a result, the reflected beam 16S' is diverging more slowly from the axicon and the seven rays appear to emanate approximately from a point on the axicon surface 10. This configuration can be useful in increasing system duty cycle and reducing aberrations in the sagittal plane of the axicon 10.

Axiconic optical pattern generators using either single axicons or dual axicons can take advantage of either the rapidly diverging condition shown in FIG. 2A or the slowly diverging condition shown in FIG. 2B. Examples of embodiments based on both of the above conditions are provided below.

Figure 3:
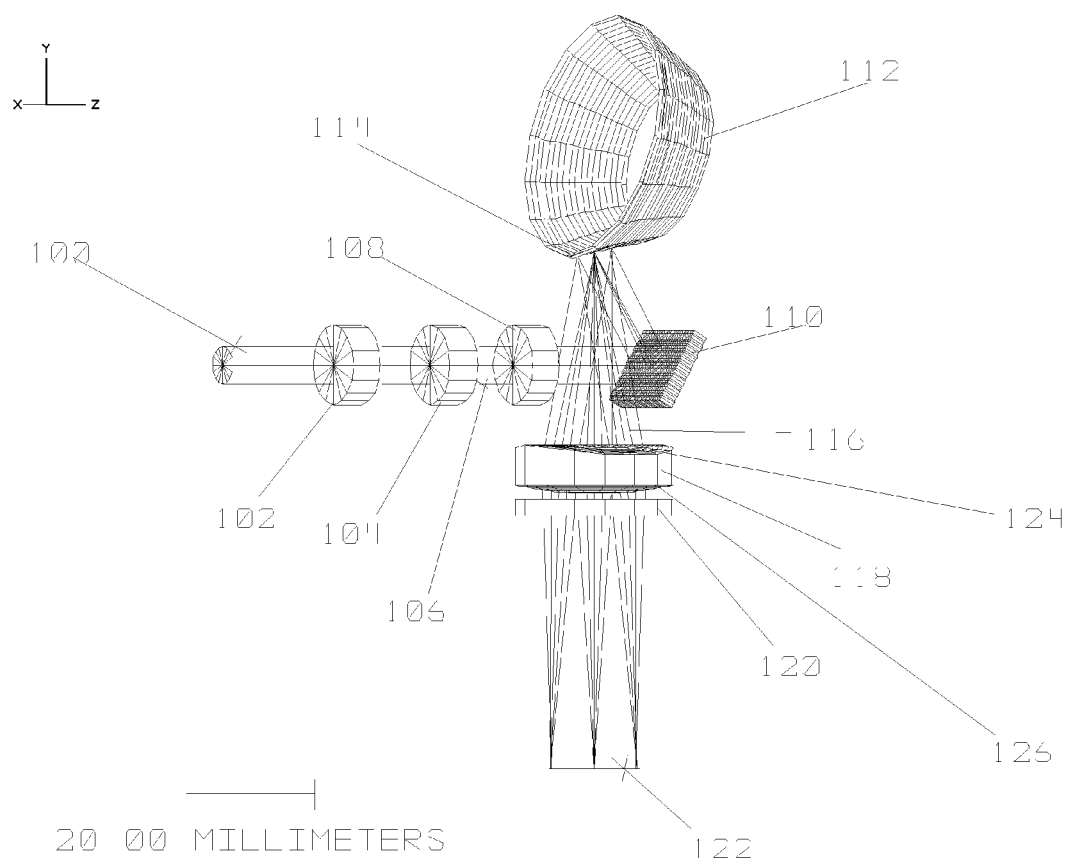
FIG. 3 is a perspective view of an axiconic optical pattern generator system using beam focusing in the sagittal plane on the axicon segment.

A large number of applications require high duty cycles and small product volumes. These applications can take advantage of a "single axicon" optical pattern generator configuration with beam focusing in the sagittal plane at the axicon surface. "Single axicon" in this context means that each ray in the optical beam reflects off a single axicon segment, although the axicon segment can be changing over time as the rotating components rotates. FIG. 3 is a perspective view of an embodiment of a single axicon optical pattern generator. A collimated input beam 100, typically from a laser energy source, passes through two lenses 102 and 104 which operate as a telescope with adjustable power that serves to select a beam diameter that will provide the necessary image size and to move the image surface selectably in front of or behind the treatment surface to optimize the treatment regimen selected by the operator.

The expanded beam 106 exiting the telescope group 102, 104 enters a beam-conditioning lens 108 that focuses the input beam in the sagittal plane onto the surface of a rotating component 112 that includes a plurality of axicon segments, each of which may have a different included angle. A fold mirror 110 may be placed between the beam-conditioning lens 108 and the rotating component 112 to reduce the system volume. The optical beam 106 reflects from one of the axicon segment surfaces 114 and the exiting beam 116 enters an imaging lens 118. A window 120 may be used to seal the system. The beam is focused on the treatment location 122. Note that the treatment "location" 122 will be shown as a planar surface where the beam is focused. This is done for clarity. In fact, the treatment location may be non-planar and even truly three-dimensional. In addition, the point of focus may not be the same as the location of maximum effect. FIG. 3 shows three different beams focusing at three different locations on treatment surface 122. The three beams correspond to three axicon segments with different included angles. That is, the three beams will not appear simultaneously on the treatment location 122. Rather, they will appear sequentially as each axicon segment rotates through the incident optical beam.

In FIG. 3, either side of lens 108 has a cylindrical surface that focuses the incident beam 106 onto one of the axicon surfaces 114. The cylindrical surface is arranged so the beam is focused sharply in the sagittal plane (a line focus is formed lying on the surface of the axicon segment 114). The rotating component 112 shown in FIG. 3 has the top section truncated as this portion is not used. The imaging lens 118 has one cylindrical surface 124 and one spherical surface 126. The cylindrical surface 124 re-collimates the focused beam in the sagittal plane so the optical beam that passes through spherical surface 126 will come to a well-defined focus at the treatment surface 122 in both the meridional and sagittal planes. Because the cylindrical surface on lens 108 and the cylindrical surface 124 share a common focus at the axicon segment 114, these two cylindrical surfaces operate as a telescope in the sagittal plane. By adjusting the ratio of these two cylindrical radii, the telescope power can be selected to change the ratio of relative apertures in the meridional and sagittal planes. When the two radii are equal, the telescope sagittal magnifying power is unity and the relative aperture in the meridional and sagittal planes are the same and the image spot dimensions in these two planes are also equal. In some instances it is advantageous to have different image spot dimensions and this condition can be achieved by selecting the ratio of the two cylindrical surfaces appropriately.

Figure 4A:
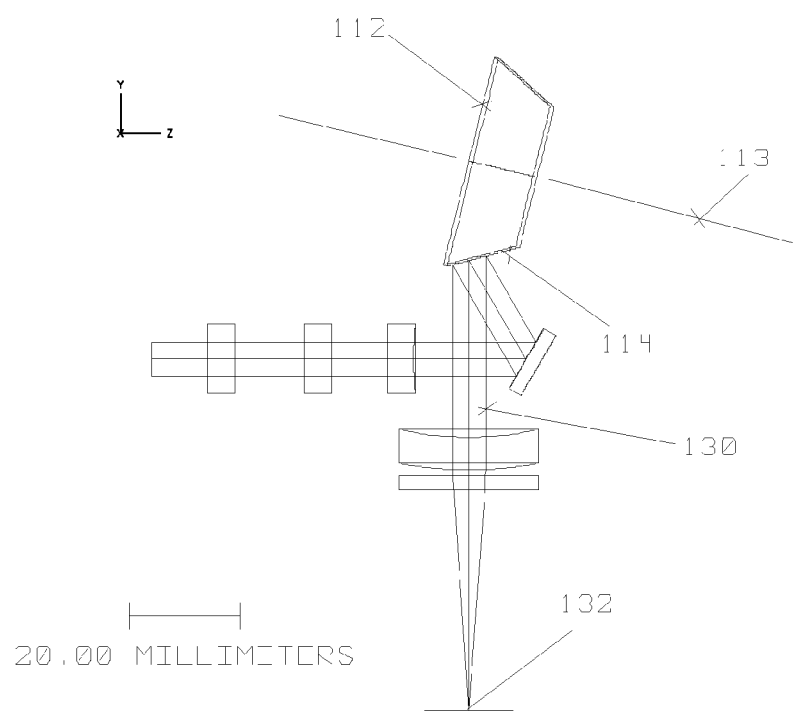
FIGS. 4A and 4B are side views of the axiconic optical pattern generator system of FIG. 3.
Figure 4B:
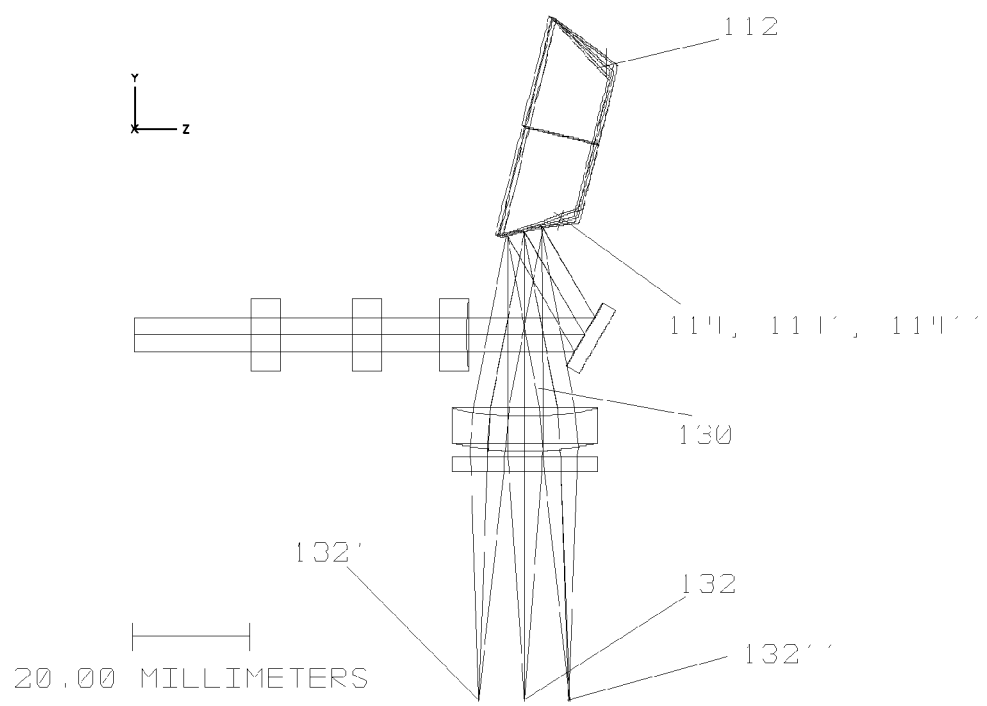

FIG. 4A shows a side view of the system in FIG. 3. The rotation axis 113 is shown. This is also the axis of revolution for the axicon segments. The beam 130 reflected from the axicon segment 114 is focused at the axial point 132 at the treatment location. FIG. 4B shows the same side view, but for three sequential axicon segments 114, 114', and 114", which produce the corresponding image points 132, 132', and 132" at the treatment location. Each different axicon segment on the rotating component 112 produces a different image point at the treatment location and each point dwells at the treatment location so long as that segment of the axicon intercepts the optical beam.

Figure 5A:
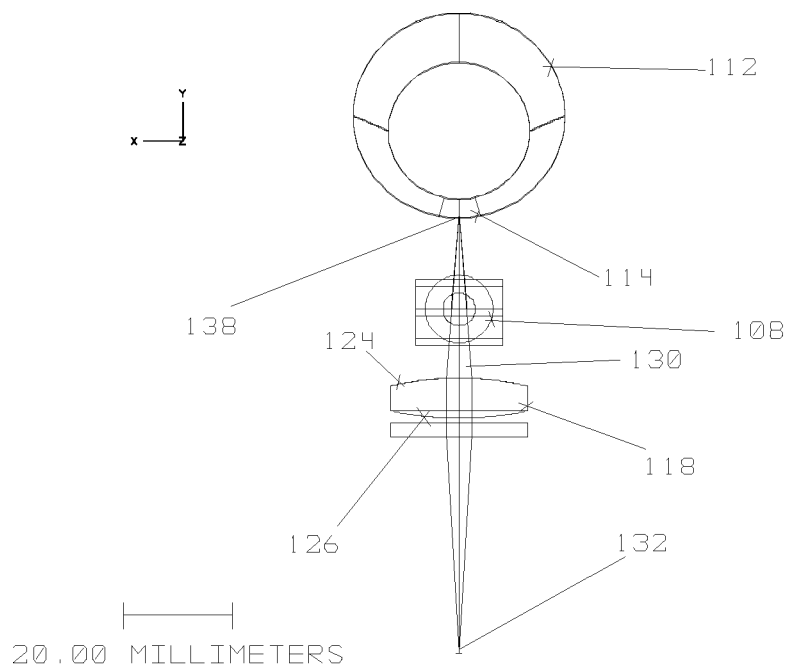
FIG. 5A is an end view of the system in FIG. 3.

FIG. 5A is an end view of the system shown in FIG. 4 where the beam focus condition on the axicon surface can be observed. The cylinder surface on lens 108 focuses the optical beam to a point 138 in the sagittal plane of the axicon segment 114. The diverging beam 130 reflected from the axicon segment 114 passes through cylinder lens surface 124 of lens 118. The cylinder lens surface 124 re-collimates the optical beam inside lens 118 and the spherical surface 126 of lens 118 focuses the optical beam at point 132 on the treatment location.

Figure 5B:
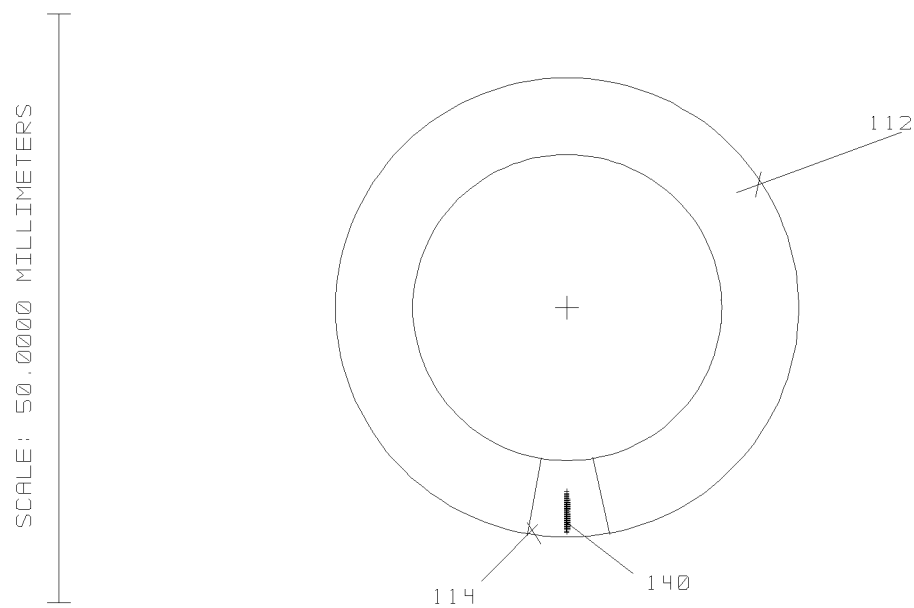
FIG. 5B is a blow-up of FIG. 5A, showing the optical beam footprint on the axicon segment.

FIG. 5B is a blow-up of FIG. 5A, and at a slightly different angle. It is a footprint diagram showing a projected view of the rotating component 112 along its axis of rotation. Axicon segment 114 is shown and the line focus 140 of the optical beam in the sagittal plane of the axicon surface can be seen. Due to the line focus in the sagittal plane, the duty cycle of this system can easily exceed 90%. From FIG. 5B, if the focused beam width at the axicon segment 114 is 0.5 mm and the circumference of the rotating component 112 at the incidence point of the optical beam is 125 mm, and there are 20 segments 114, the duty cycle is approximately [125(3.14)−(20)(0.5)][100]/[125(3.14)]=97%.

This example used cylindrical optical components to achieve compression into a line focus at the axicon segment. However, other types of anamorphic optical elements and compression to shapes other than a line focus can also be used. It is often advantageous to optically position the rotating component with the axicon segments between two anamorphic optical components, with the first anamorphic optics compressing the incident optical beam in the sagittal plane on the axicon segments and the second anamorphic optics then decompressing the optical beam after it leaves the axicon segments. Compression in the sagittal plane will generally increase the overall duty cycle of the system.

Referring again to FIG. 3, one cylindrical surface 109 on lens 108 focuses the incident collimated beam into a line on the axicon surface. A second cylindrical surface 124 on lens 118 re-collimates the beam which was focused as a line on the axicon surface. The selection of the ratio of these two cylindrical radii causes the relative aperture in image space for the meridional plane and the sagittal plane to have different values such that the image dimensions can have different dimensions (i.e., different spot widths in the sagittal and meridional planes).

Figure 6:
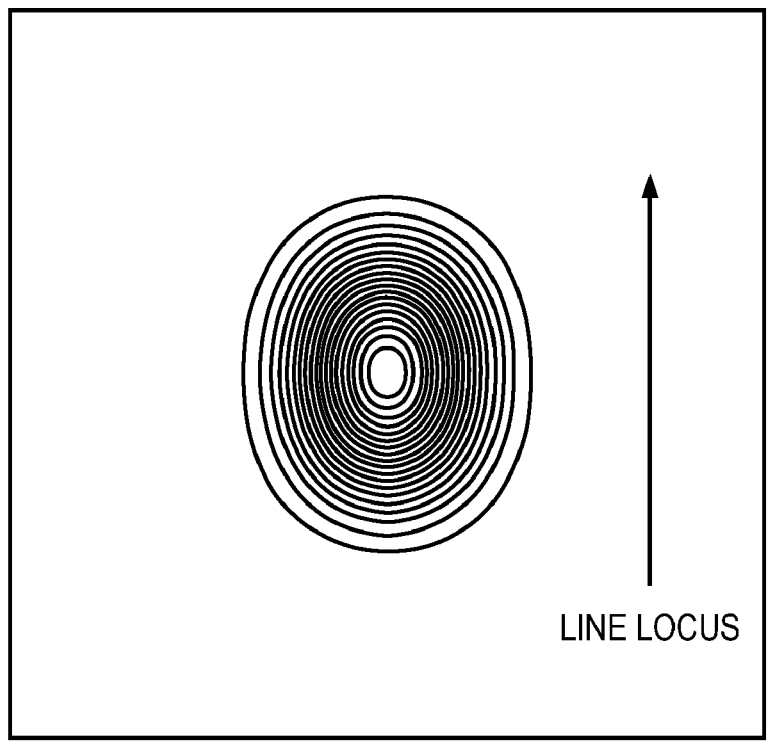
FIG. 6 is a point spread function contour plot for the condition where the second cylindrical radius is twice as long as the first cylindrical radius.

If surface 124 has a cylindrical radius that is longer than that of surface 109, the numerical aperture in the sagittal direction is greater than the numerical aperture in the meridional direction so the image dimension is shortest in the sagittal direction. FIG. 6 illustrates this image condition. In this case, the radius of surface 124 is twice as long as surface 109. FIG. 6 is a contour plot of the resulting point spread function. The arrow shows the orientation of the line locus of images produced by the different axicon segments. The line locus lies along the meridional direction and the sagittal direction is orthogonal to the line locus.

Figure 7:
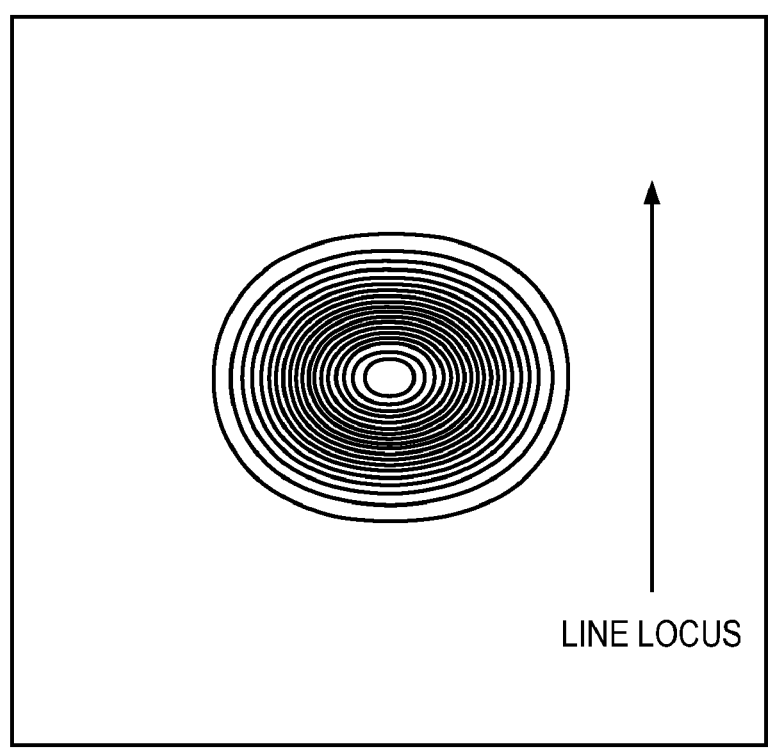
FIG. 7 is a point spread function contour plot for the condition where the first cylindrical radius is twice as long as the second cylindrical radius.

Conversely, when the cylindrical radius of surface 109 is longer than that of surface 124, the numerical aperture in the meridional direction is greater than the numerical aperture in the sagittal direction so the image dimension is shortest in the meridional direction. FIG. 7 illustrates this image condition. The arrow shows the orientation of the line locus.

Some applications can take advantage of an image spot that is spread out along the direction of the line locus and this condition can be achieved by selecting the cylindrical radius of lens 118 longer than the cylindrical radius of lens 108. Other applications can take advantage of an image spot that is spread out perpendicular to the direction of the line locus and this condition can be achieved by selecting the cylindrical radius of lens 118 shorter than the cylindrical radius of lens 108. Still other applications can take advantage of image spots that have equal dimensions along the direction of the line locus and perpendicular to the direction of the line locus and this condition can be achieved by making the cylindrical radii on lenses 108 and 118 equal in magnitude.

The location of the cylindrical surface 109 on element 108 is shown on the second side of the element but can alternatively be located on the first side of the element. Similarly, the location of the cylindrical surface 124 on element 118 is shown on the first side of the element but could alternatively be located on the second side of the element.

Figure 8:
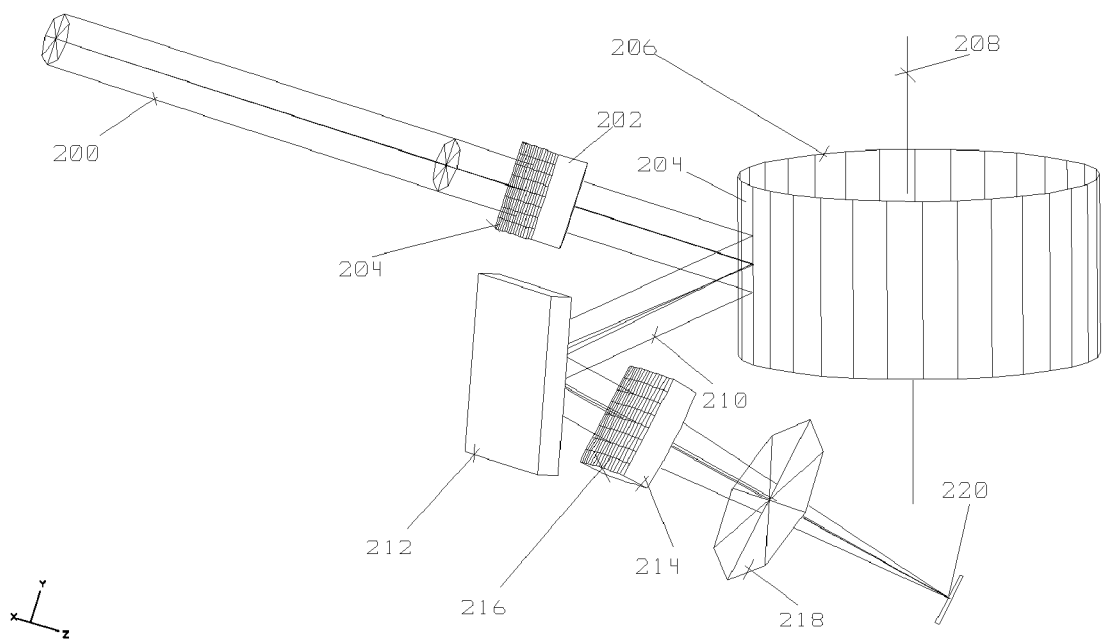
FIGS. 8, 9 and 10 are a perspective view, side view and bottom view of an axiconic optical pattern generator system based on axicon segments with small included angles.

The embodiment shown in FIGS. 3-7 uses an axicon component with segments that are steeply inclined relative to their common axis of revolution. Another embodiment is shown in FIG. 8 where the axicon surfaces are only shallowly inclined relative to the axis of revolution. In face, some or more of the axicon segments may degenerate into a right circular cylinder segment (i.e., included angle of zero degrees) and the remaining axicon segments may have small included angles that are both positive and negative with respect to the right circular cylinder surface. The right circular cylinder surface is a degenerate axicon surface in the same mathematical sense that a circle is a degenerate ellipse. Therefore this embodiment still uses axicon segments but the included angles are small such that more compact systems are possible and smaller variation in aberrations at the axicon surface can be achieved.

In FIG. 8, an incident optical beam 200 passes through a cylindrical lens 202 with a cylindrical surface 204 that focuses the beam into a line image on segment 204 of a multi-segment rotating component 206 which has a rotation axis 208. The reflected beam 210 intercepts fold mirror 212 and then passes through cylindrical lens 214 with cylindrical surface 216. The cylindrical surface 216 re-collimates the line focus at the axicon segment 204 and the beam then passes through an imaging lens 218 and is focused at the treatment location 220. Compared to the system of FIG. 3, the embodiment of FIG. 11 reduces the incidence angle at the axicon segment 204 so that optical aberrations are reduced and image quality can be improved relative to the system shown in FIG. 3.

As with the system of FIG. 3, selecting the ratio of the cylindrical radii 204 and 216 causes the image dimensions to be either circular or elliptical at the treatment location 220.

Figure 9:
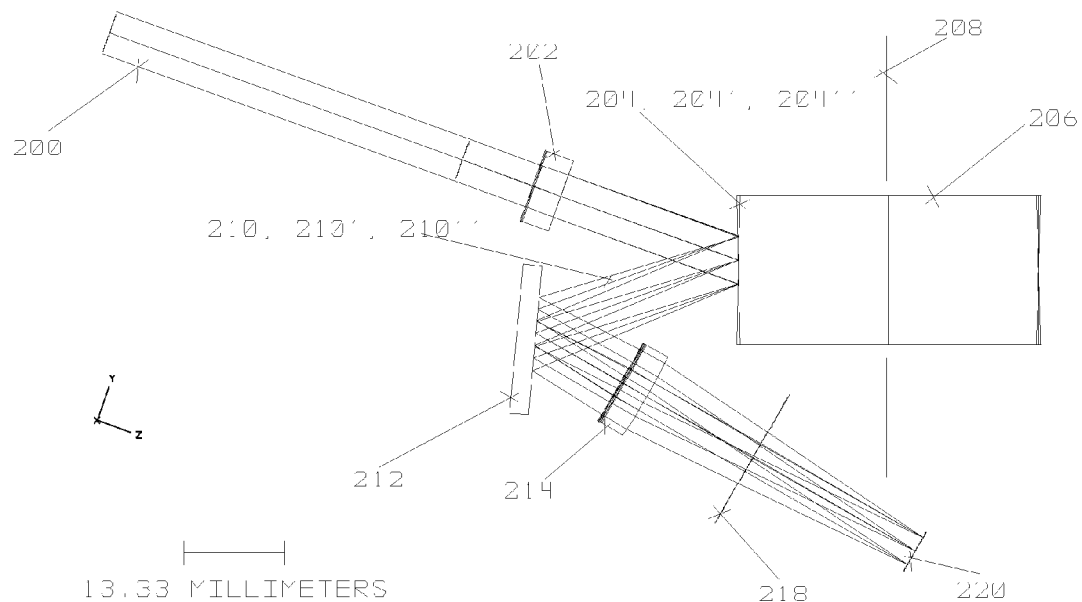
Figure 10:
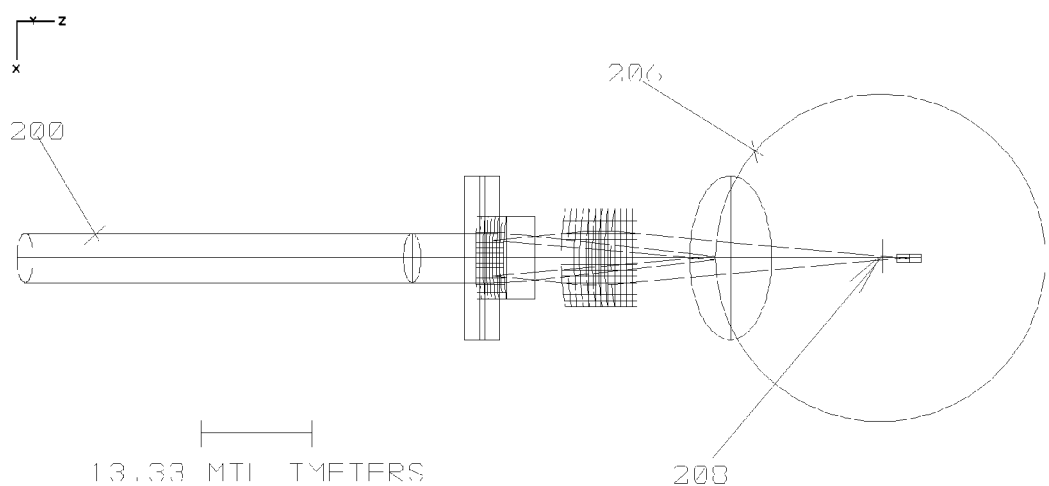

FIGS. 9 and 10 are a side view and bottom view of the embodiment shown in FIG. 8. FIG. 9 shows three different axicon segments 204, 204' and 204" that cause the incident beam to be reflected as beams 210, 210', and 210". Three image points are presented at the treatment location 220 by these three axicon segments. Larger numbers of axiconic segments are used for most applications, but only three are shown for clarity. In the bottom view of FIG. 10, note that the incident beam 200 and the axis of rotation 208 lie in a plane that also includes the reflected beam.

Figure 11:
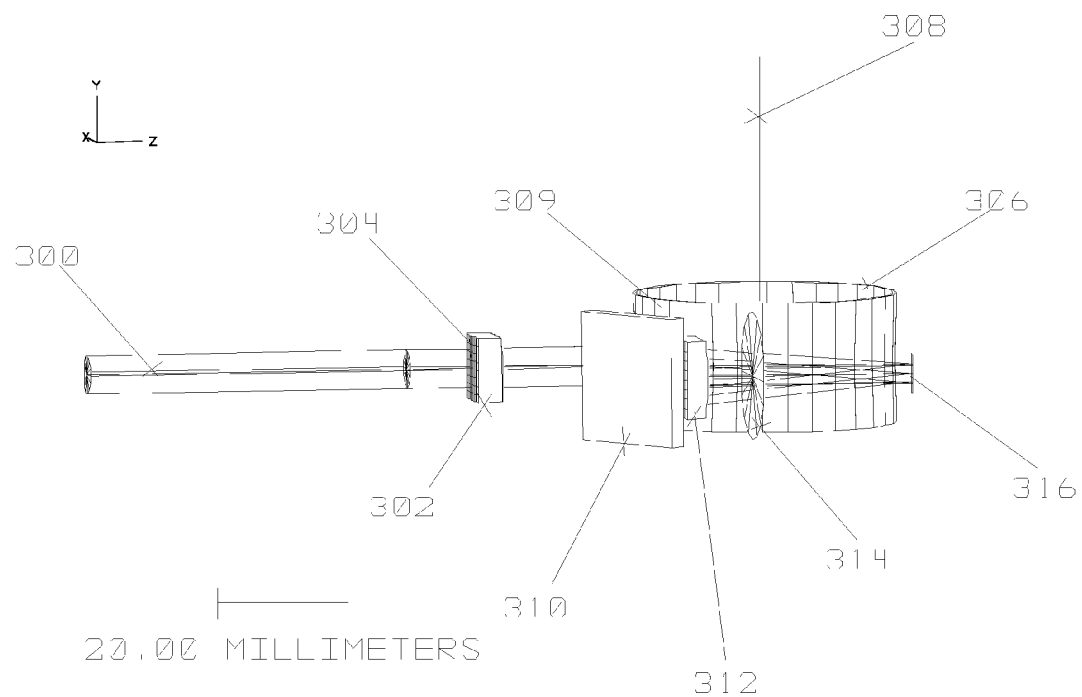
FIGS. 11 and 12 are a perspective view and a top view of another axiconic optical pattern generator system where the axicon segments have small included angles.
Figure 12:
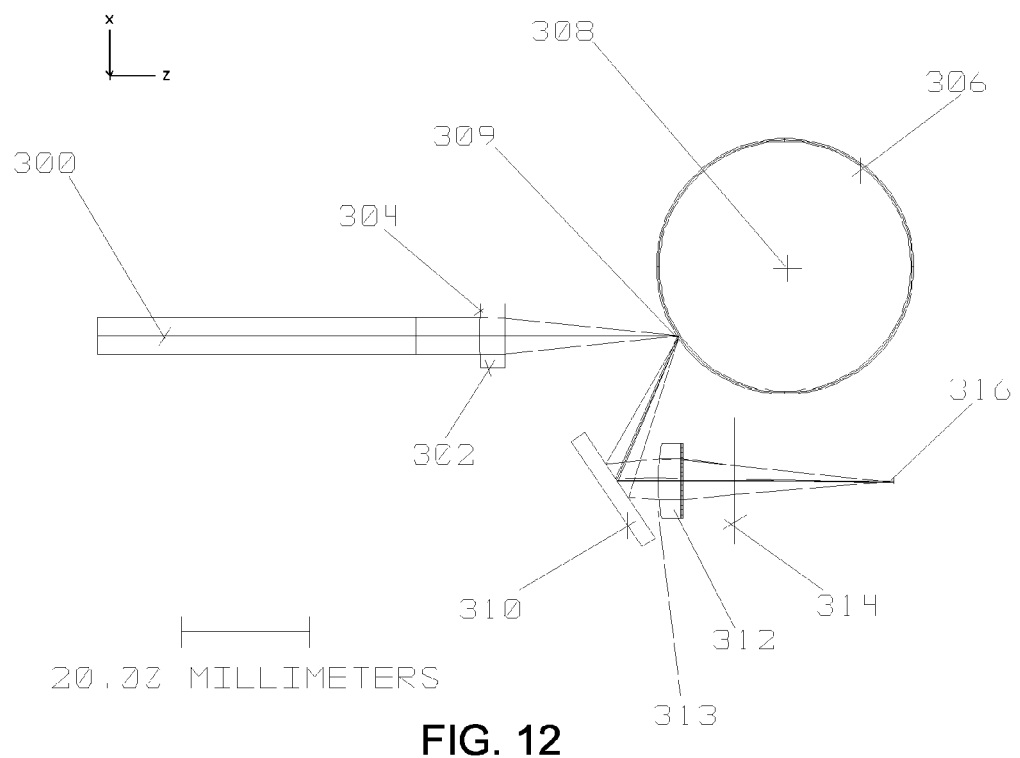

FIGS. 11 and 12 are a perspective view and a top view, respectively, of another single axicon embodiment where the axicon segments have small included angles. In FIG. 12 it can be seen that the incident beam 300 is focused in the sagittal plane by the cylindrical surface 304 on lens 302 and that the incident sagitally focused beam is incident on the axicon segment 309 at an angle to the segment normal. As component 306 rotates about its axis 308, the sagitally focused beam is reflected at a constant angle into lens 312 via fold mirror 310. The cylindrical surface 313 on lens 312 recollimates the beam in the sagittal plane. The reflected angle is constant for all axicon segments on the component 306 in the sagittal direction. Each axicon segment 309 and its neighbors have different tilt angles in the meridional plane and therefore change the reflected beam angle in the meridional plane so that an imaging lens group 314 produces a series of image points at the treatment location 316. Three image points are shown in FIG. 11.

Figure 13:
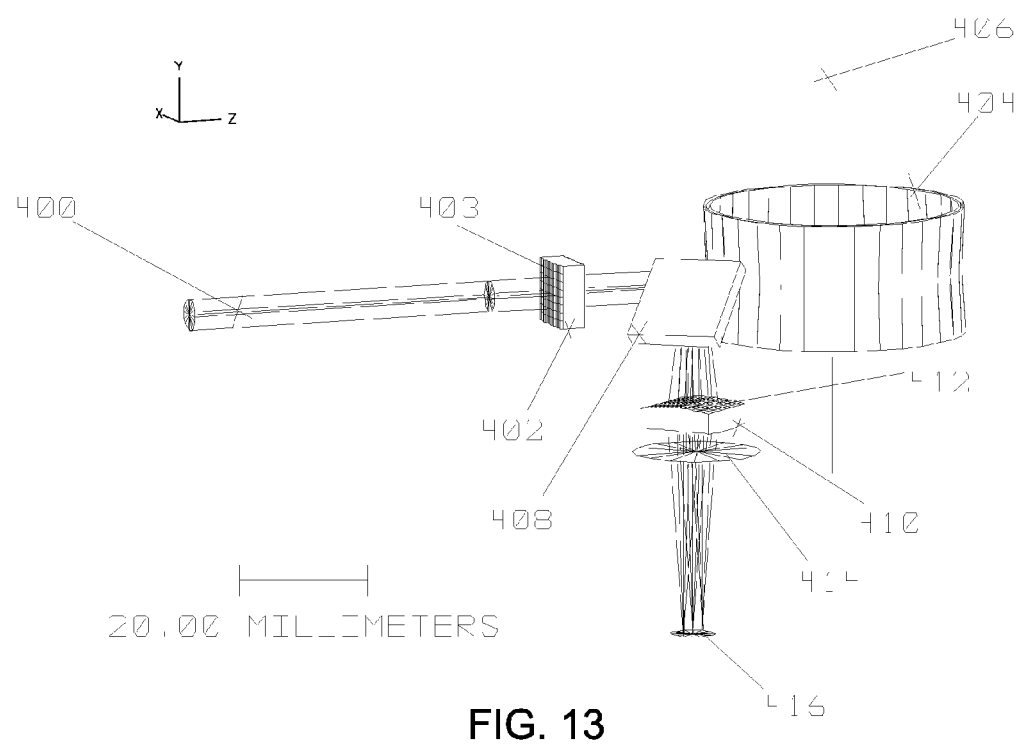
FIGS. 13, 14 and 15 are a perspective view, side view and top view of yet another axiconic optical pattern generator system.
Figure 14:
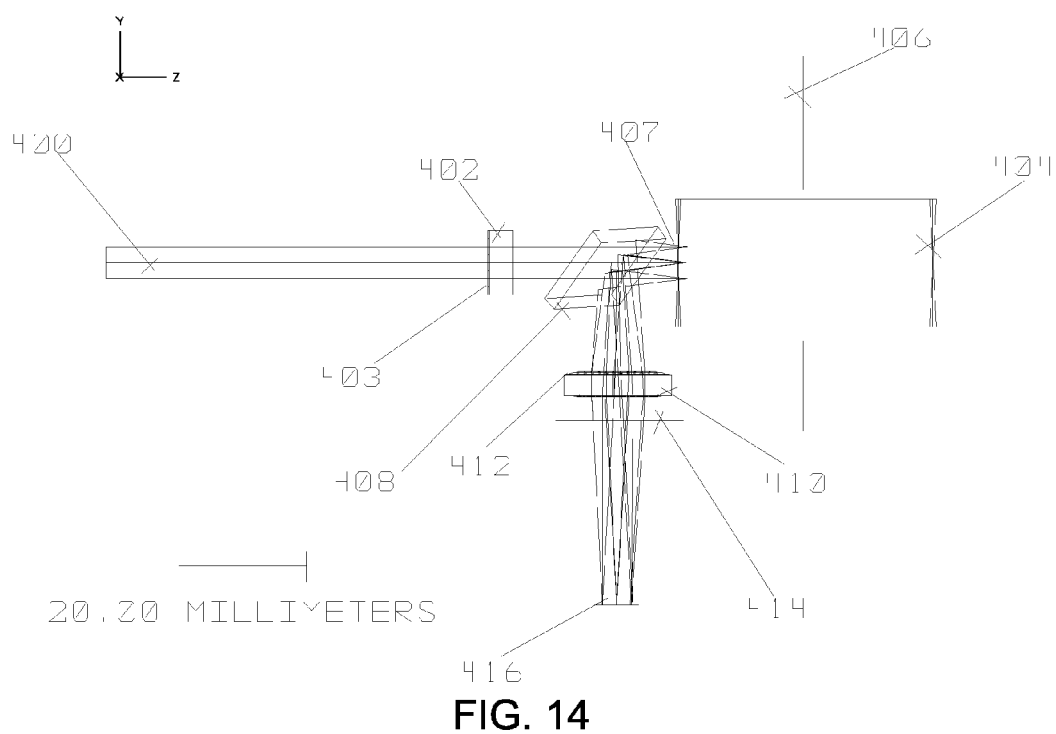
Figure 15:
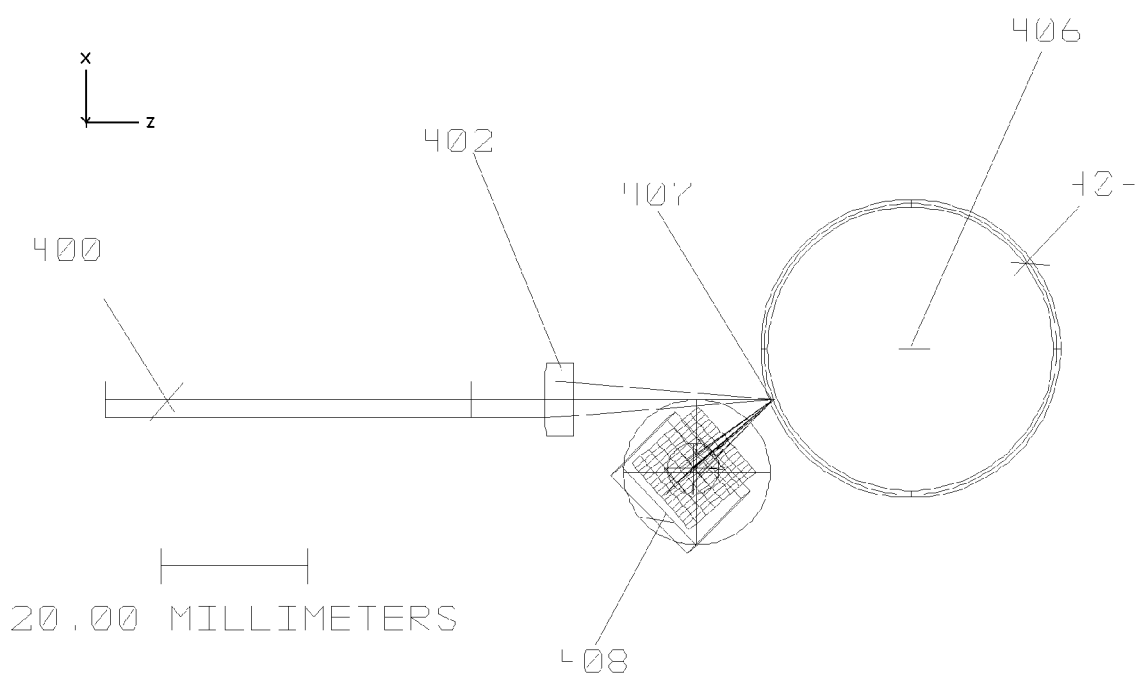

Some applications require an image line locus that is not parallel to the rotation axis. FIGS. 13-15 show an embodiment where the image line locus at treatment location 416 is perpendicular to the rotation axis 406. The incident optical beam 400 passes through lens 402 with a cylindrical surface 403 that focuses the beam in the sagittal plane on a segment of the rotating component 404 with rotation axis 406. The fold mirror 408 turns the reflected beam so that it is parallel with the rotation axis 406. The reflected beam passes through lens 410 which has a cylindrical surface 412 that re-collimates the beam in the sagittal plane. The collimated beam passes through imaging lens 414 and comes to a focus at the image surface 416 which lies in a plane perpendicular to the rotation axis 406. This embodiment also takes advantage of the incident beam in the meridional plane being perpendicular to the rotating component 404 so that optical aberrations are reduced.

Many applications exist for optical pattern generators that produce a controlled displacement of the image figure transversely to the direction of the line pattern locus. Devices that are moving with respect to the treatment plane can take advantage of this transverse image figure movement to cancel the blur of the image figure induced by the relative movement of the system. Other devices such as industrial micro-welding products can take advantage of a moving image figure to spread the energy across a larger area to improve thermal welding conditions.

Figure 16:
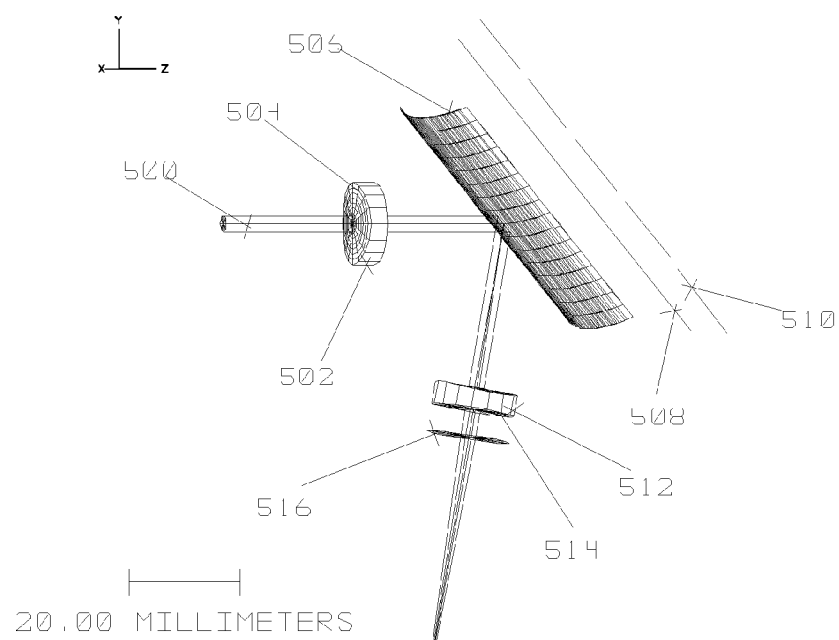
FIGS. 16 and 17 are a perspective view and a top view of an axiconic optical pattern generator system in which the axis of rotation and the axis of revolution for the axicon segments is separated, and the image figure moves transversely to the line locus direction.
Figure 17:
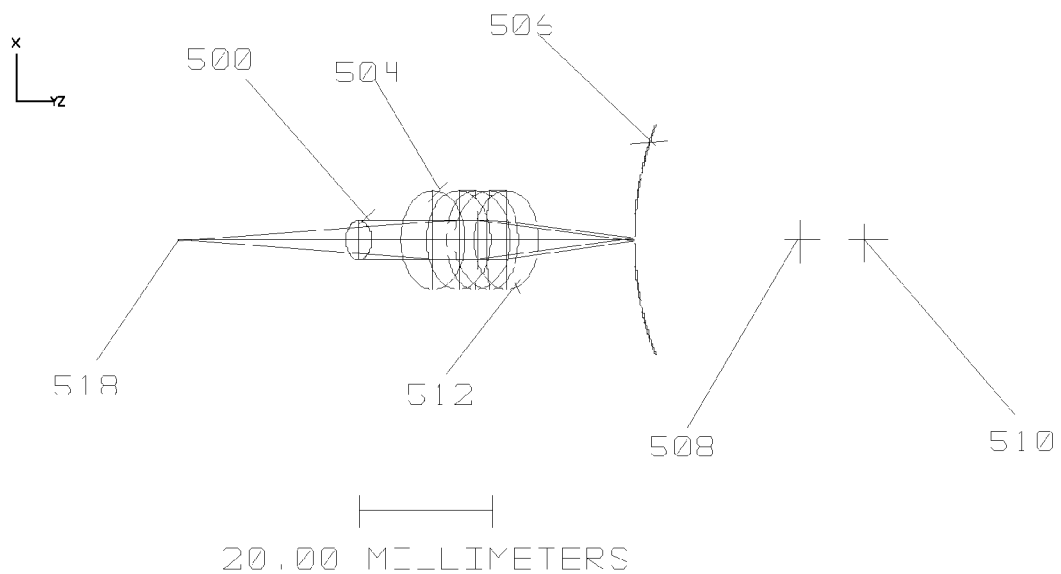
Figure 18:
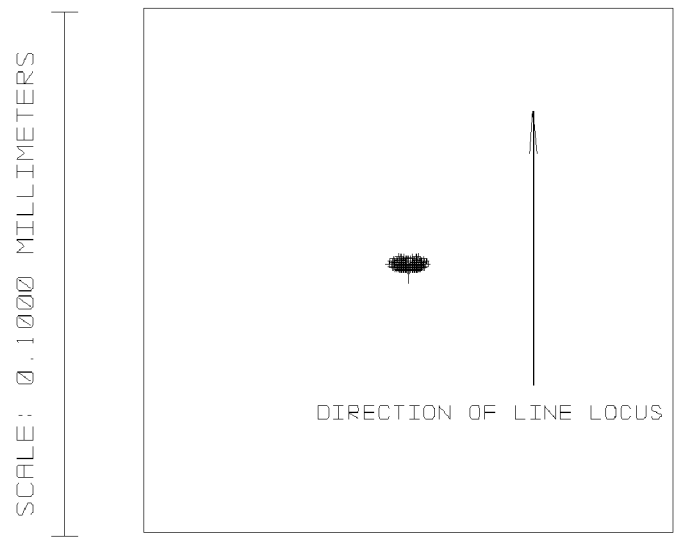
FIG. 18 is a spot diagram of the figures formed by an axiconic optical pattern generator system with coincident axes of rotation and revolution.
Figure 19:
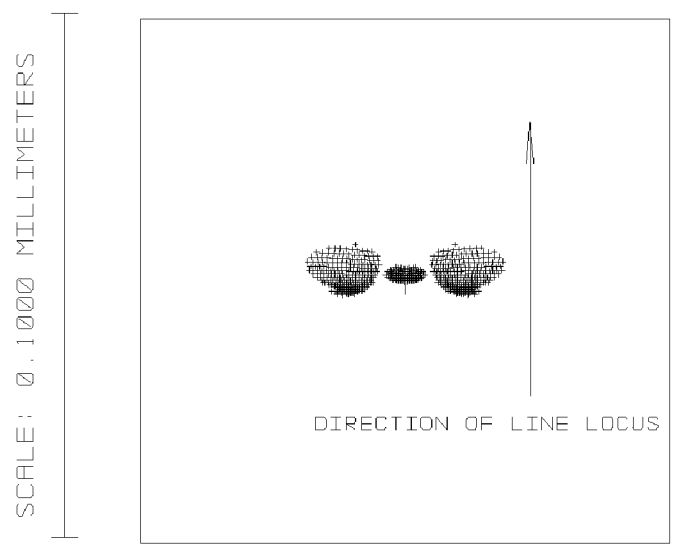
FIG. 19 is a spot diagram of the figures formed by the axiconic optical pattern generator system of FIG. 16, with separated axes of rotation and revolution.

The axiconic optical pattern generators disclosed herein can include this transverse image figure movement feature by separating the rotation axis and the axis of revolution for the axicon segments. FIG. 16 shows an example. An incident optical beam 500 passes through a cylindrical lens 502 that focuses the beam in the sagittal plane on the axicon segment 506. The axicon segment 506 has an axis of revolution 510 (i.e., the axicon surface is rotationally symmetric about axis 510) that is separated from the axis of rotation 508 (i.e., the axicon segment physically rotates about axis 508). If these two axes 508 and 510 are coincident, the axicon segment rotates through itself as described in the previous examples. If these two axes 508 and 510 are displaced as shown in FIGS. 16 and 17, then the image figure will be transversely displaced at the treatment location as the axicon segment rotates about axis 508. FIG. 18 shows the image figure at the treatment location when the two axes 508 and 510 are coincident and no transverse image movement is present. FIG. 19 shows the image figure at the treatment location when the two axes 508 and 510 are displaced and transverse image movement is present. The three clusters of spots in FIG. 19 correspond to three different rotation positions for the axicon segment. In FIG. 18, the same spot diagram is produced for all three rotation positions.

Displacement of axes 508 and 510 can introduce a small image defocus for the axicon surface shown in FIGS. 16 and 17. An improved design uses aspheric rather than circular sections so the axicon surface normal changes with rotation while axicon surface displacement relative to the incident optical beam is reduced. The techniques described above can also be used with other axiconic designs, and not only the specific design shown in the example of FIGS. 16 and 17.

Further variations to the various embodiments of the axiconic optical pattern generators are possible by using multiple input beams to increase the number of figures produced, for example to increase the image figure density along the line locus, or to produce 2D or zig-zag image patterns. Medical applications can often benefit from higher image figure densities, faster pattern generation rates, or 2D image patterns. Micro-welding applications also benefit from these improvement features.

Figure 20:
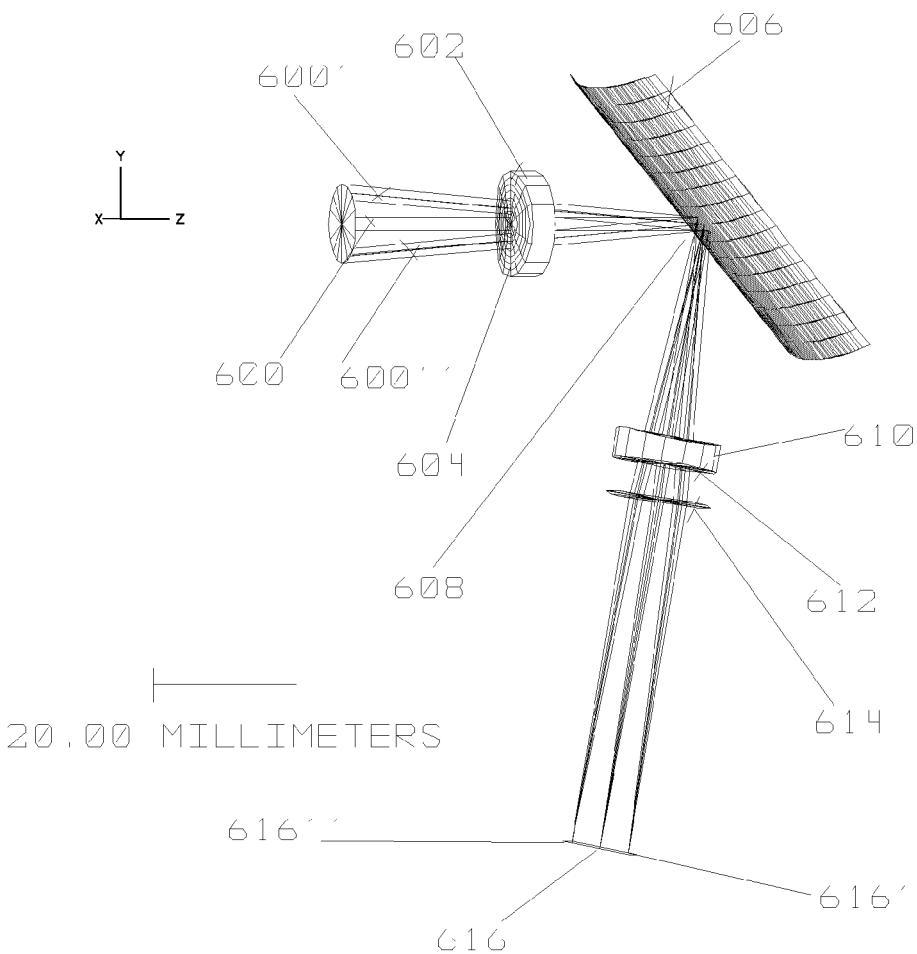
FIG. 20 is a perspective view of an axiconic optical pattern generator that uses multiple input beams to increase the number of image figures produced.
Figure 21:
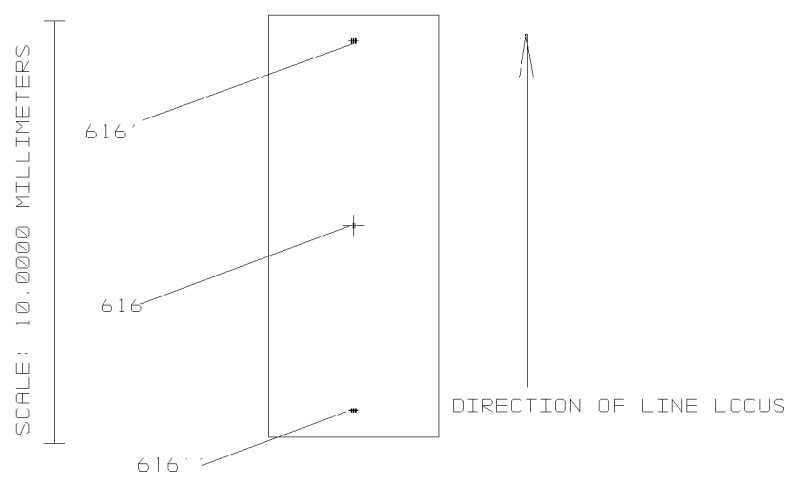
FIG. 21 shows spot diagrams of three image figures produced simultaneously by the three input beams of FIG. 20.
Figure 24:
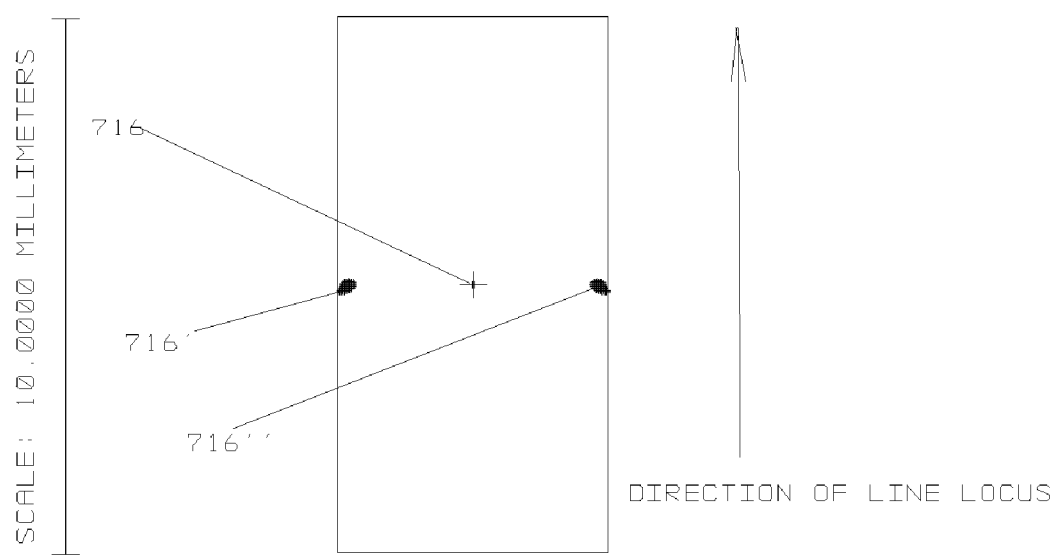
FIG. 24 shows spot diagrams of three image figures produced simultaneously by the three input beams of FIG. 22.

FIG. 20 shows a perspective view of an axiconic optical pattern generator using multiple input beams aligned in the meridional plane such that multiple image figures are simultaneously produced along the line locus of the treatment pattern. In FIG. 20, input optical beams 600, 600', and 600" pass through the cylindrical lens 602 with cylindrical surface 604 to form line foci on the axicon segment 606 at the common aperture stop 608. The reflected multiple beams pass through lens 610 with cylindrical surface 612 to become recollimated in the sagittal plane and then to enter imaging lens 614. Each of the multiple input beams 600, 600', and 600" simultaneously form image FIGS. 616, 616', and 616" along the line locus of the pattern. FIG. 24 shows the interception of the multiple image FIGS. 616, 616', and 616" at the treatment location along the line locus of the pattern.

Figure 22:
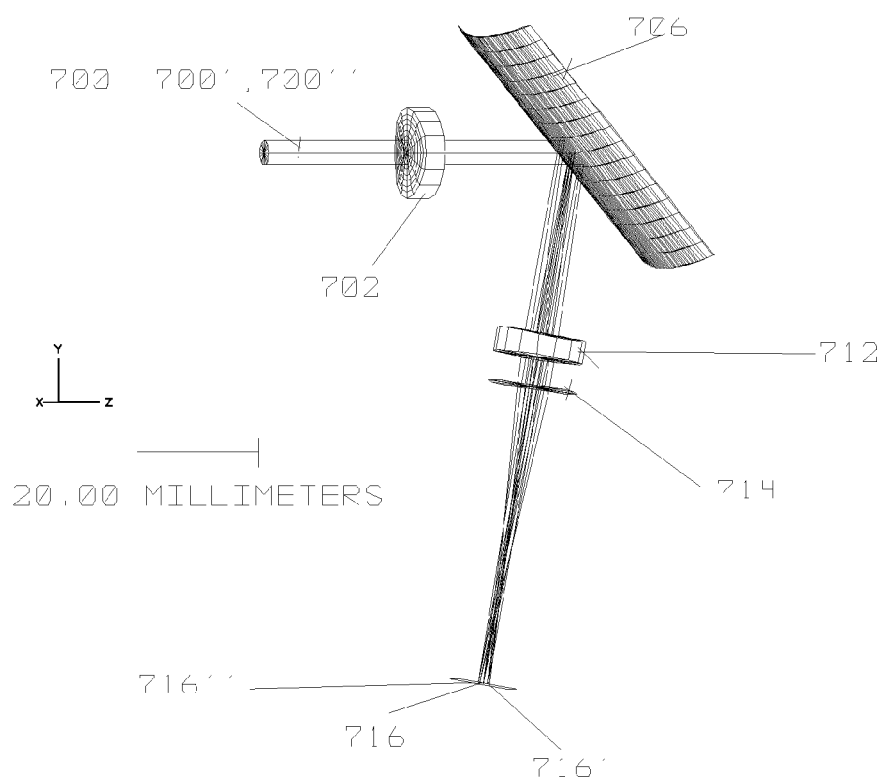
FIGS. 22 and 23 are a perspective view and a top view of an axiconic optical pattern generator with multiple input beams introduced in the sagittal plane.

For certain applications, it can also be advantageous to produce an image pattern that has image figures that are displaced transversely from the pattern line locus. Staggered image patterns may be produced in this manner and faster movement of the device along the treatment location can also be achieved with multiple simultaneous image figures that are displaced along the direction of the device movement. FIG. 22 shows a perspective view of an axiconic optical pattern generator where multiple input beams are introduced in the sagittal plane in order to simultaneously produce image figures that are displaced transverse to the pattern line locus. In FIG. 22, multiple input beams 700, 700', and 700" lying in the sagittal plane pass through lens 702 which focuses all of the beams in the sagittal plane on the axicon segment 706. The multiple beams are reflected from the axicon segment 706 and pass through lens 712 which re-collimates all of the beams in the sagittal plane. The collimated beams then pass through image lens 714 and are incident at the treatment location as image points 716, 716', and 716".

Figure 23:
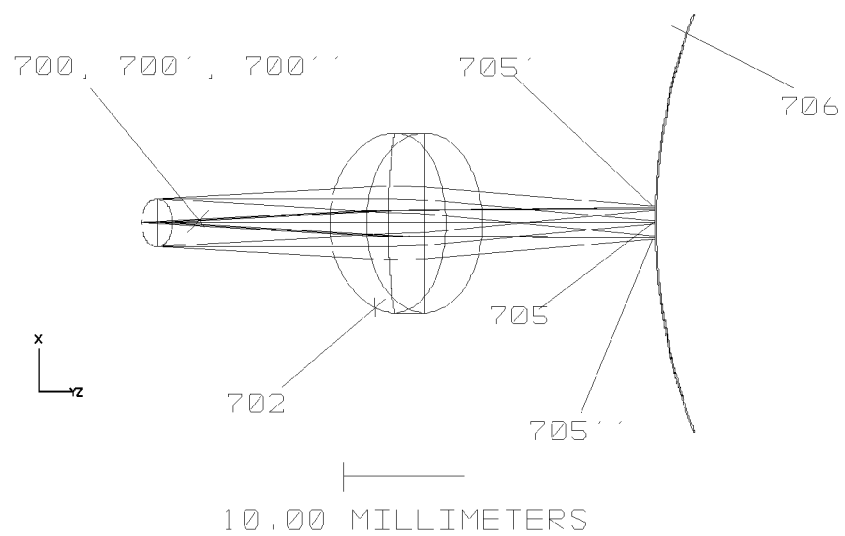

FIG. 23 shows a view of this embodiment where the multiple input beams in the sagittal plane 700, 700', and 700" are focused by lens 702 in the sagittal plane on the surface of the axicon segment 706. The input beams 700, 700', and 700" are focused in the sagittal plane as intermediate image points 705, 705', and 705" on the axicon surface segment 706, and these intermediate image points are subsequently re-imaged onto the treatment location as image points 716, 716', and 716". FIG. 24 shows the multiple images produced at the treatment location by the multiple input beams in the sagittal plane. Image points 716, 716', and 716" are shown in FIG. 24 to be transversely displaced with respect to the direction of the pattern line locus.

One advantage of the axiconic optical pattern generator is the ability to attain different numerical apertures in the meridional and sagittal planes so that the image figure can have different dimensions along the line locus of the pattern and transverse to the line locus of the pattern. The above embodiments all provide this feature. There are some applications for optical pattern generators where very large differences in image figure dimensions are advantageous. For these applications, an optical pattern generator that uses two instead of one axiconic component is a preferred arrangement.

Figure 25:
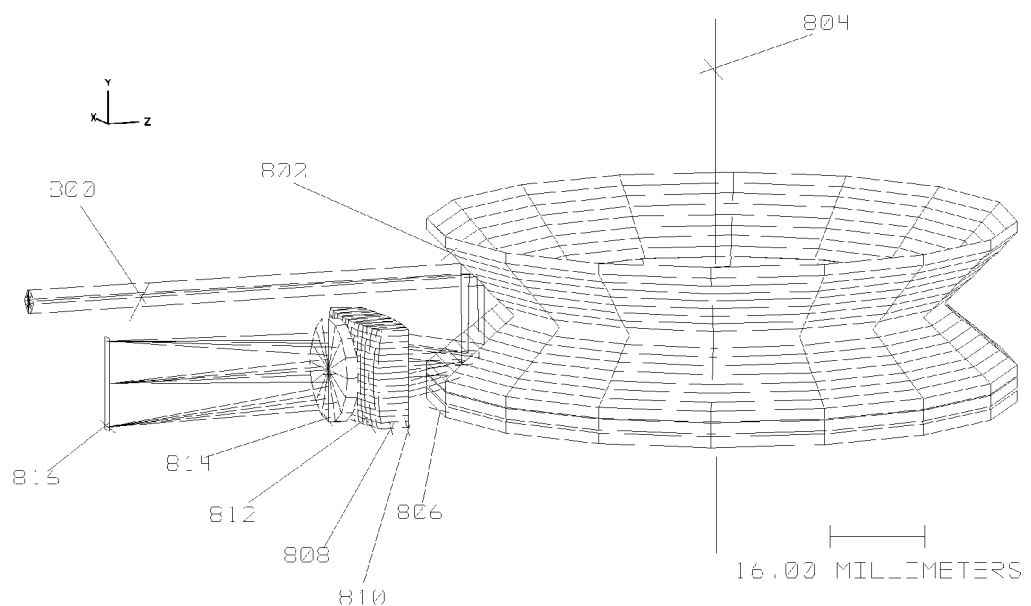
FIGS. 25, 26 and 27 are a perspective view, side view and top view of a dual-axicon optical pattern generator.
Figure 26:
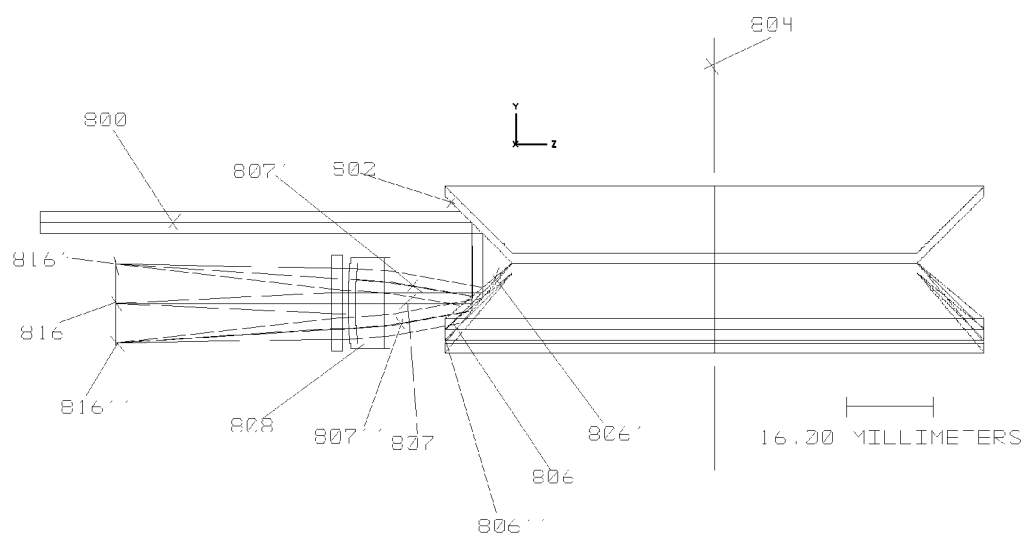
Figure 27:
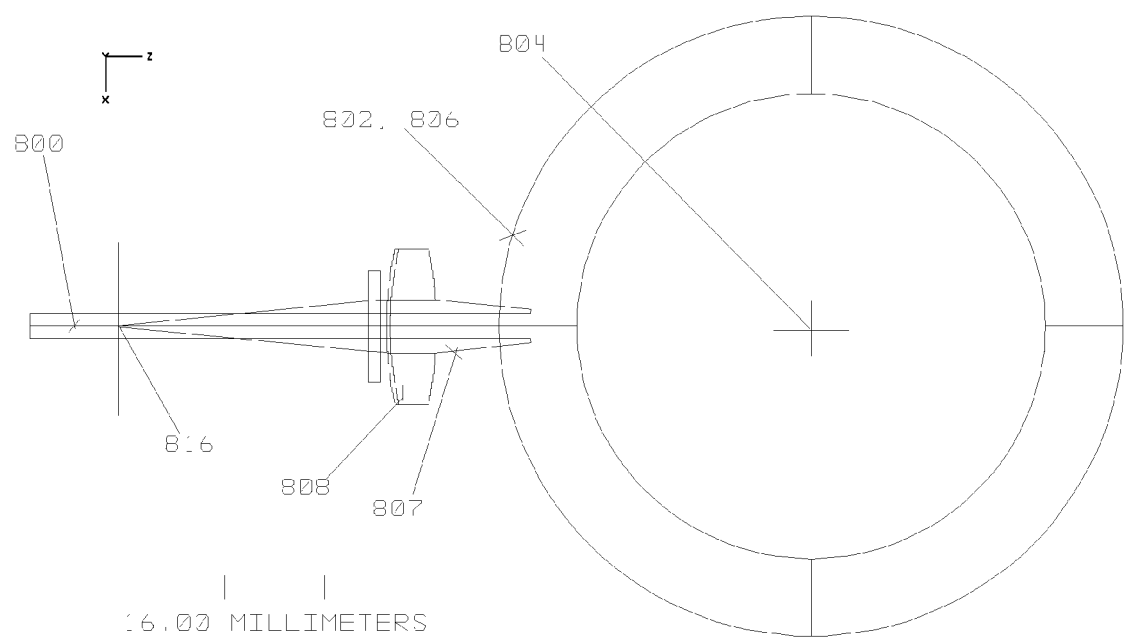

FIGS. 25, 26 and 27 are a perspective view, side view and top view of an axiconic optical pattern generator that uses two instead of one axiconic component. This will be referred to as a "dual axicon" optical pattern generator. An input optical beam 800 is first incident on an axicon segment 802 which has a rotation axis 804. In this embodiment, all of the axicon segments 802 are identical and have the same included angle. For this specific embodiment, a single non-rotating axicon mirror can be used instead since all axicon segments are the same. Other embodiments are possible where the axicon segments 802 have different included angles and deflect the input beam 800 differently for each segment as the rotating component rotates about axis 804. The input optical beam is reflected by the axicon segment 802 and subsequently reflected by the second axicon segment 806. For this specific embodiment, the axicon segments 806 have different included angles and reflect the optical beam at different angles for each axicon segment 806. For other embodiments, the axicon segment 802 can have different included angles for each segment while axicon segment 806 has the same included angle for all segments and can be a non-rotating axicon surface.

For this specific embodiment, the optical beam reflected from axicon segments 806 have different angles in the meridional plane and pass through lens 808. Lens 808 has one surface 810 which is a cylindrical surface. The optical beams reflected from axicon segments 802 and 806 have strong divergence in the sagittal plane and cylindrical surface 810 collimates the multiple reflected beams in the sagittal plane. Surface 812 of lens 808 is spherical and focuses the multiple reflected beams at the treatment location 816 after passing through a plano-plano window element 814.

In one variation, axicon segments 802 and 806 can be identical so both axicon surfaces contribute to the optical beam deflection. Furthermore, the rotating components containing segments 802 and 806, respectively, can be the same component so that manufacturing complexity is reduced. For this last case, the included angles can be chosen so the sum of the deflection for each segment pair yields the correct beam deflection angle.

The side view of FIG. 26 illustrates the multiple reflected optical beams that result from axicon segments which have different included angles. In FIG. 26, input optical beam 800 reflects from axicon segment 802. The optical beam subsequently reflects from one of several sequential axicon segments 806, 806', and 806" and each of these axicon segments reflects the optical beams 807, 807', and 807" at different angles in the meridional plane. Lens 808 subsequently focuses these reflected beams at image points 816, 816', and 816" on a line in the meridional plane.

FIG. 27 is a top view. The input optical beam 800 reflects from the axicon segments 802, 806 on the two rotating components, which rotate about the common axis 804. The reflected beam subsequently enters lens 808. The optical beam 807 reflected from the two axicon segments 802, 806 is strongly diverging in the sagittal plane before it enters lens 808. This strong divergence is re-collimated by lens 808 and imaged onto the treatment location 816. The strong divergence in the sagittal plane of beam 807 causes the sagittal beam width at lens 808 to be much larger than the meridional beam width at lens 808 so that the image figure dimensions at the treatment plane 816 are much different in the sagittal and meridional directions. This variation in image figure dimensions is very desirable for certain optical pattern generator applications.

Figure 28:
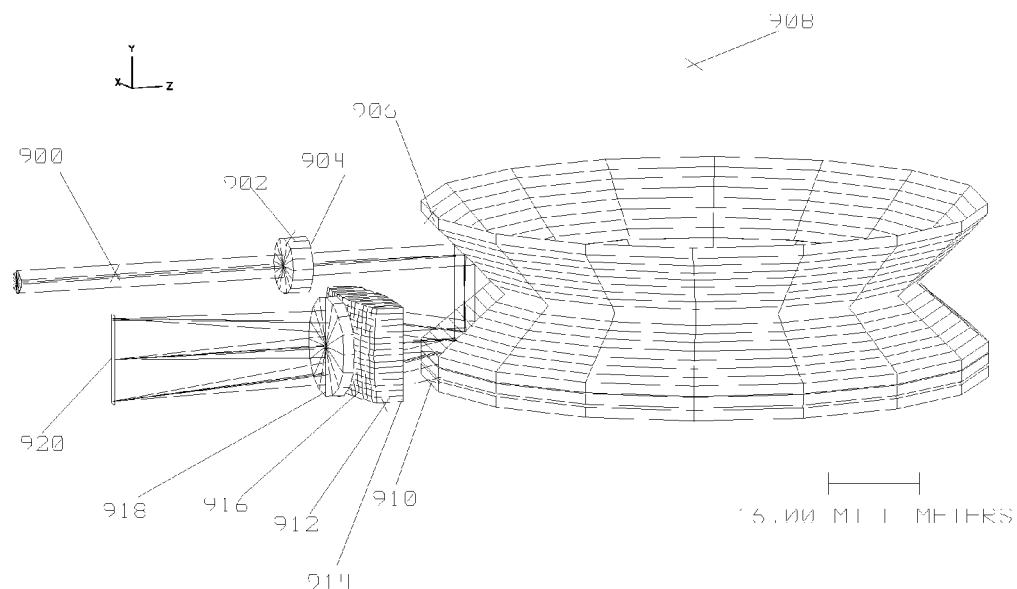
FIGS. 28 and 29 are a perspective view and a top view of a dual axicon embodiment with improved duty cycle.
Figure 29:
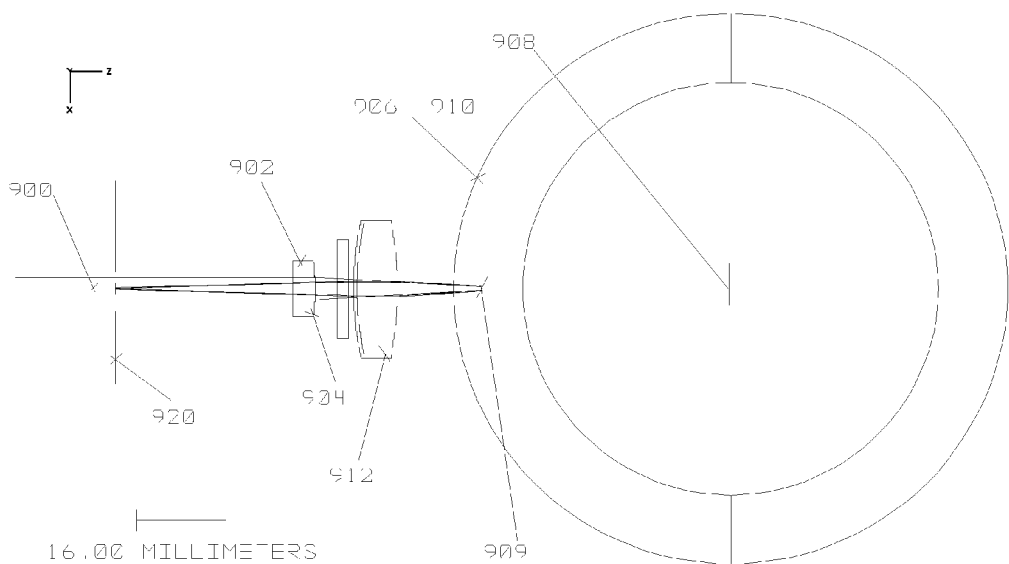

The dual axicon optical pattern generator has a duty cycle limited by the width of the beam at the axicon segments in the sagittal direction. The duty cycle of this system can be improved by adding a cylindrical lens in the incident beam to focus the beam midway between the dual axicon's opposing segments in the sagittal direction. FIG. 28 shows a perspective view of such an embodiment. FIG. 29 shows the top view. The incident beam 900 passes through lens 902 which has a cylindrical surface 904 that focuses the beam in the sagittal direction between axicon segments 906 and 910 which rotate about axis 908. After reflection from segments 906 and 910, the optical beam is re-collimated by cylindrical surface 914 of lens 912. The re-collimated beam is focused by surface 916 of lens 912 at image surface 920. The top view of FIG. 29 illustrates how incident beam 900 is focused in the sagittal plane by lens 902 to form a line image 909 between the axicon segments 906, 910.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein.

What is claimed is:

1. A single axicon optical pattern generator for generating a pattern of figures at a target location, comprising:
   a rotating component having a plurality of reflective axicon segments, the axicon segments having at least two different included angles, the rotating component positioned so that the axicon segments rotate through an incident optical beam as the rotating component rotates about its rotation axis, each axicon segment deflecting the incident optical beam to generate a figure from the pattern of figures,
   wherein each of the axicon segment is a surface of revolution that is rotationally symmetric about an axis of revolution.

2. The single axicon optical pattern generator of claim 1 further comprising:
   a first anamorphic optical component that compresses the incident optical beam in the sagittal plane as imaged onto the axicon segments; and
   a second anamorphic optical component that decompresses the optical beam in the sagittal plane after leaving the axicon segment, the rotating component optically positioned between the first and second anamorphic optical components.

3. The single axicon optical pattern generator of claim 2 wherein the first anamorphic optical component compresses the incident optical beam into a line focus at the axicon segments.

4. The single axicon optical pattern generator of claim 2 wherein the optical beam is collimated when entering the first anamorphic optical component, the first anamorphic optical component compresses the incident optical beam into a line focus at the axicon segments, and the second anamorphic optical component re-collimates the optical beam.

5. The single axicon optical pattern generator of claim 2 wherein the first anamorphic optical component comprises a first cylindrical optical component and the second anamorphic optical component comprises a second cylindrical optical component.

6. The single axicon optical pattern generator of claim 2 further comprising a non-anamorphic imaging lens optically positioned between the rotating component and the target location, to focus the optical beam into a spot at the target location.

7. The single axicon optical pattern generator of claim 2 wherein a relative optical power of the first and second anamorphic optical components is adjustable, thereby adjusting a ratio of the numerical apertures in the sagittal and meridional planes at the target location and also adjusting a ratio of the spot widths of the optical beam in the sagittal and meridional planes at the target location.

8. The single axicon optical pattern generator of claim 1 wherein the axicon segments are segments of right circular cone surfaces having a common axis of revolution.

9. The single axicon optical pattern generator of claim 1 wherein the axicon segments have small included angles.

10. The single axicon optical pattern generator of claim 1 wherein the axis of revolution for the axicon segments is coincident with the rotation axis of the rotating component.

11. The single axicon optical pattern generator of claim 1 wherein the axis of revolution for the axicon segments is not coincident with the rotation axis of the rotating component, but is parallel to and displaced from the rotation axis.

12. The single axicon optical pattern generator of claim 1 wherein the optical beam enters the optical pattern generator from a direction that lies in a common plane with the rotation axis but is not parallel to the rotation axis.

13. The single axicon optical pattern generator of claim 1 wherein the optical beam enters and exits the axicon segments from directions that lies in a common plane with the rotation axis.

14. The single axicon optical pattern generator of claim 1 wherein the optical beam enters and exits the axicon segments from directions that are skew to the rotation axis.

15. The single axicon optical pattern generator of claim 1 wherein the rotating component is positioned so that the axicon segments rotate through multiple incident optical beams as the rotating component rotates about its rotation axis, the different optical beams generating different figures in the pattern of figures.

16. The single axicon optical pattern generator of claim 15 wherein the multiple incident optical beams are presented in a sagittal plane normal to the rotation axis.

* * * * *

UNITED STATES PATENT AND TRADEMARK OFFICE
CERTIFICATE OF CORRECTION

| | | |
|---|---|---|
| PATENT NO. | : 8,289,603 B2 | Page 1 of 1 |
| APPLICATION NO. | : 12/333079 | |
| DATED | : October 16, 2012 | |
| INVENTOR(S) | : Leonard C. Debenedictis et al. | |

It is certified that error appears in the above-identified patent and that said Letters Patent is hereby corrected as shown below:

Col. 4, line 54
"axicon segments is" should be -- axicon segments are --

Col. 5, line approx. 56-57
"axicon segments rotate" should be -- axicon segments rotates --

Col. 6, line approx. 39
"rotating components rotates" should be -- rotating components rotate --

Col. 7, line approx. 24
"planes are the same" should be -- planes is the same --

Claim 1
Col. 13, line 12
"each of the axicon segment is" should be -- each of the axicon segments is --

Signed and Sealed this
Twenty-second Day of January, 2013

David J. Kappos
*Director of the United States Patent and Trademark Office*